June 23, 1970  R. CAPGRAS  3,516,683
HYDROPNEUMATIC SUSPENSION
Filed March 27, 1968  3 Sheets-Sheet 1
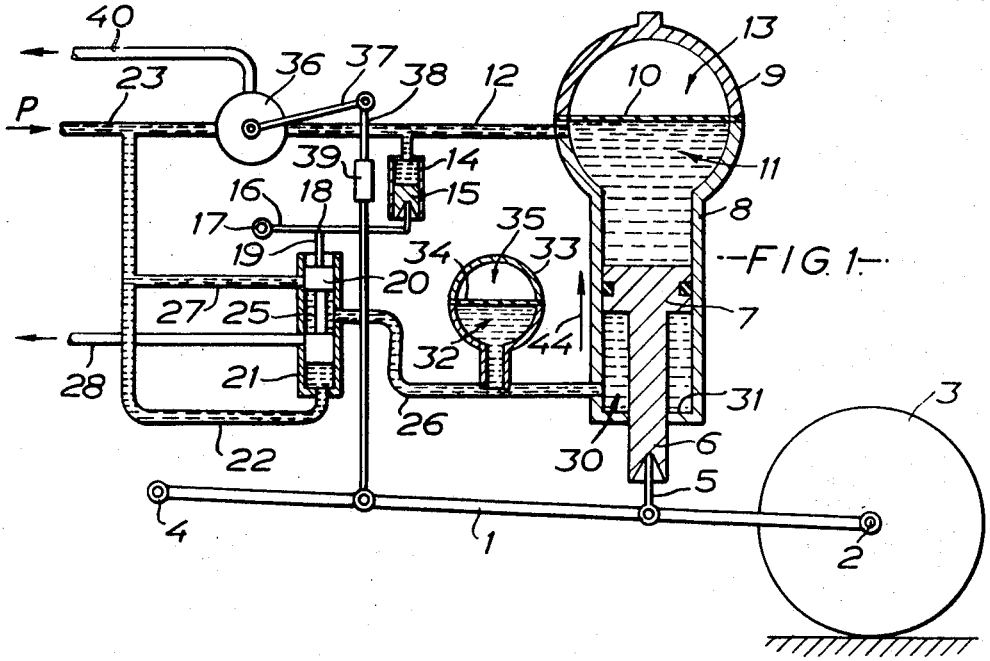
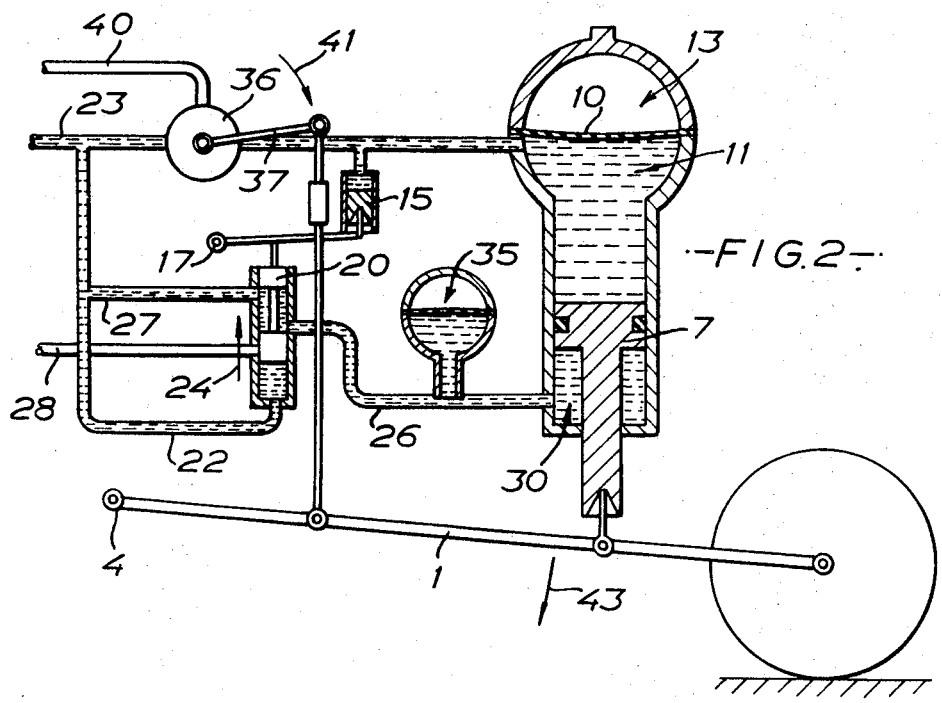
INVENTOR:
René CAPGRAS
BY
Karl F. Ross
Attorney June 23, 1970  R. CAPGRAS  3,516,683
HYDROPNEUMATIC SUSPENSION
Filed March 27, 1968  3 Sheets-Sheet 2
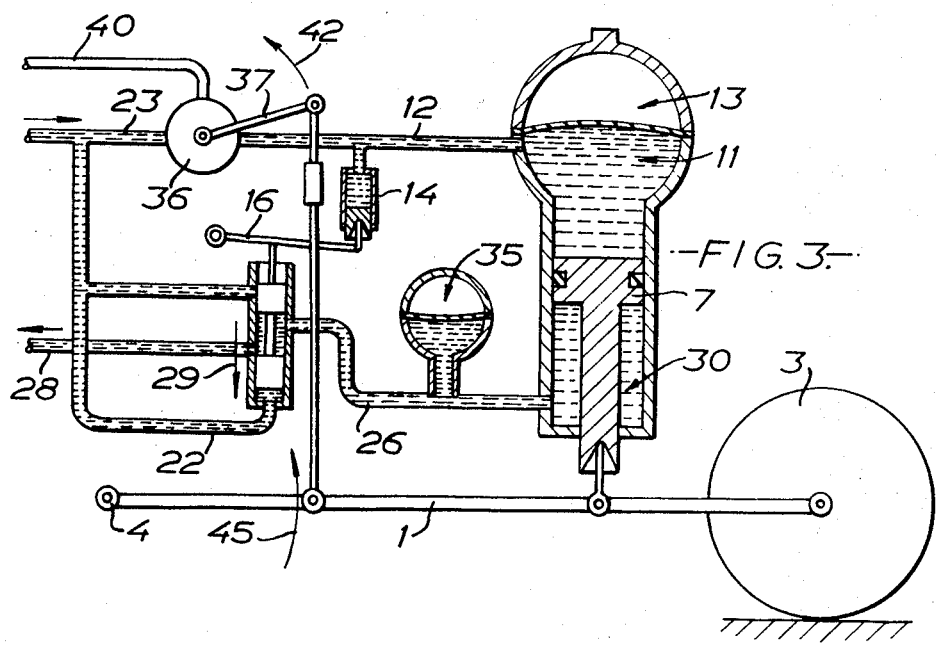
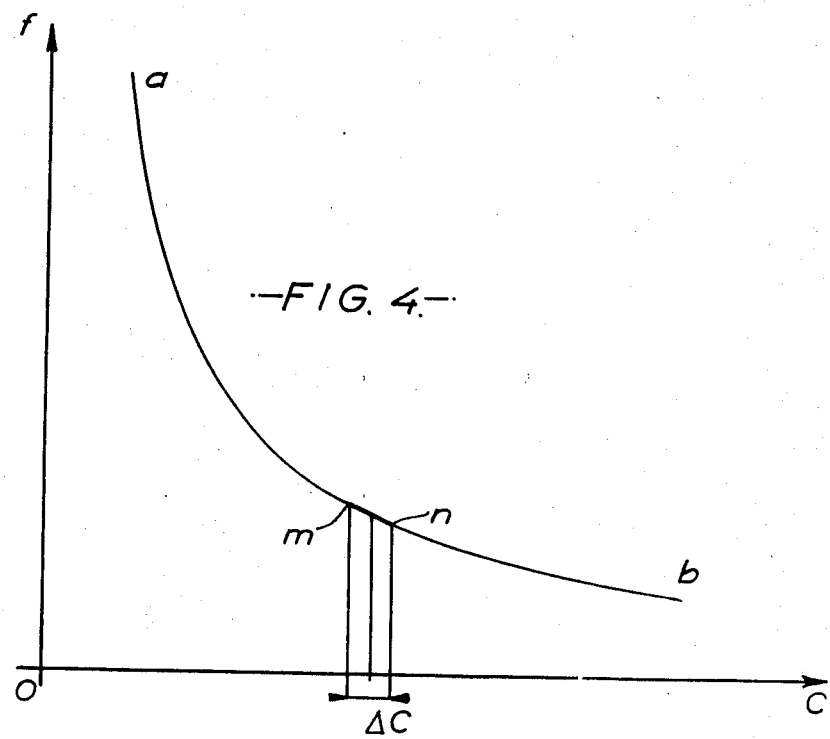
INVENTOR:
René CAPGRAS
BY *Karl F. Ross*
Attorney June 23, 1970   R. CAPGRAS   3,516,683
HYDROPNEUMATIC SUSPENSION
Filed March 27, 1968   3 Sheets-Sheet 3
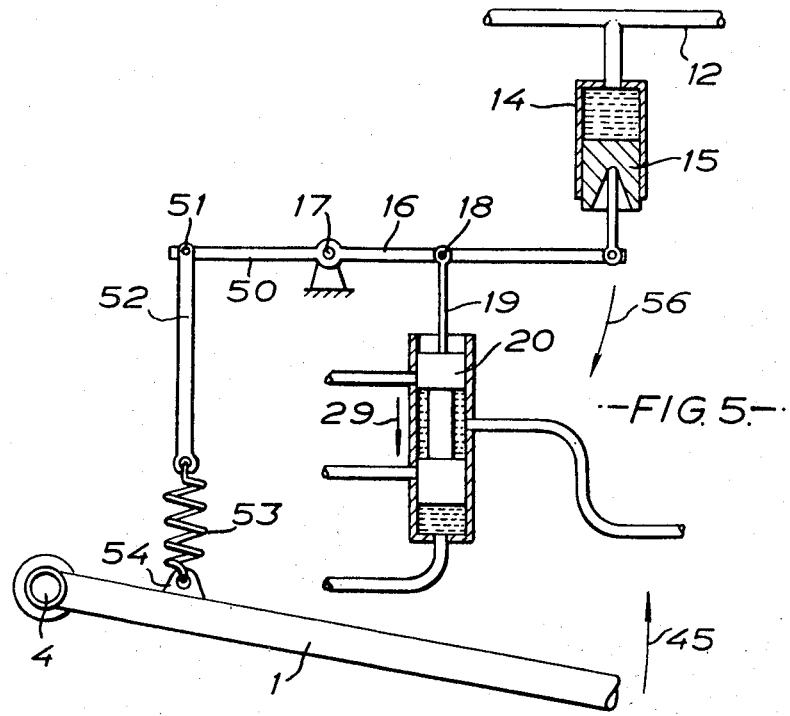
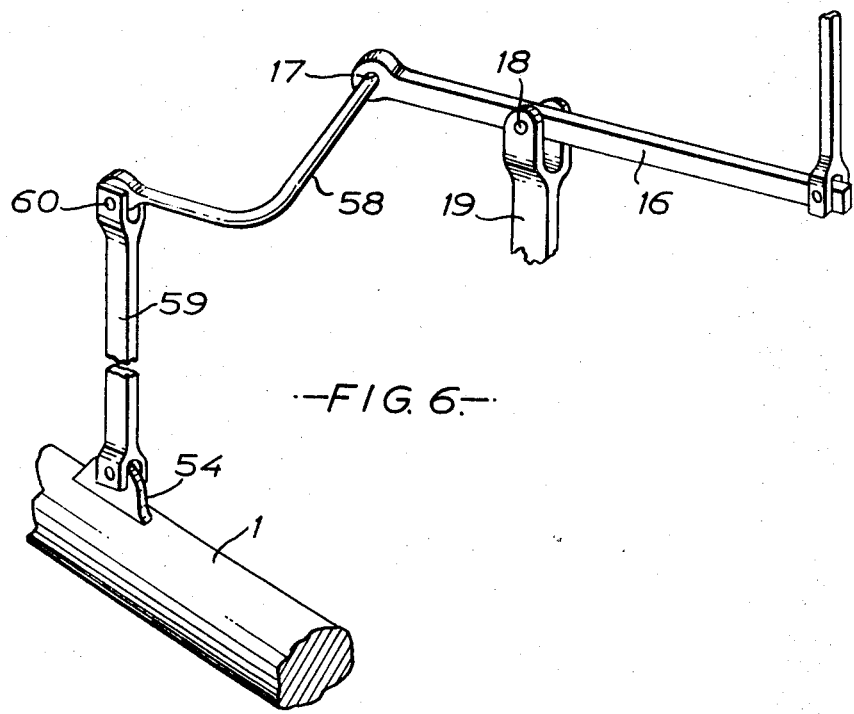
INVENTOR:

United States Patent Office 3,516,683
Patented June 23, 1970

3,516,683
HYDROPNEUMATIC SUSPENSION
René Capgras, Paris, France, assignor, by mesne assignments, to Industrial Development Company Establishments, Vaduz, Liechtenstein, a corporation of Liechtenstein
Filed Mar. 27, 1968, Ser. No. 716,607
Claims priority, application France, Mar. 29, 1967, 48,465; June 19, 1967, 48,805
Int. Cl. B60g 3/14, 17/04
U.S. Cl. 280—124                                    10 Claims

ABSTRACT OF THE DISCLOSURE

A vehicular shock absorber has a double-acting piston (7) coupled with a wheel-supporting arm (1) and loaded from above by a gas cushion. The weight of the vehicle, tending to drive the piston upwardly, is supplemented by a virtual load constituted by the output of a hydraulic pressure accumulator (35) acting upon the lower face of the piston, this virtual load being varied inversely to the loading of the vehicle in response to changes in the ground clearance of the vehicle body to maintain the overall load, and thereby the pressure of the gas cushion, substantially constant.

---

The present invention relates to improvements to hydropneumatic suspensions. It is known that the hydropneumatic suspensions of conventional type present a hyperbolic characteristic which corresponds to an excessive no-load flexibility, whilst on the other hand the suspension is much too hard when the vehicle is under load. This disadvantage is particularly appreciable on utility vehicles such as trucks whose total road weight varies considerably according to whether they are empty or loaded.

The invention has the main object of avoiding these disadvantages by creating a suspension device with a constant flexibility whatever its load may be.

According to the invention there is provided a hydropneumatic wheel suspension or shock absorber including a pivotally mounted suspension arm for a vehicle wheel, a piston slidably disposed within a cylinder and connected to the suspension arm so that movements of the arm are transmitted to said piston which acts against a volume of oil to compress to a greater or lesser extent a cushion of gas contained in a reservoir, the piston being of the double-acting type and being acted upon on a lower face by a volume of oil communicating with an auxiliary cushion of gas contained in a chamber of an auxiliary reservoir; the last-mentioned volume of oil may also communicate with a supply of oil under pressure or alternatively with a return pipe according to the position of a slide-valve subject to two opposing thrusts, i.e. a pressure of oil acting on one end at supply pressure and a thrust acting on the other end proportional to the pressure of the first-mentioned volume of oil.

It will be understood that a suspension according to the invention subjects the main gas cushion to a compression force which results on the one hand from the load carried by the vehicle, and on the other from the hydraulic trust exerted on the lower face of the piston. The compensation mechanism included in the system allows the sum of these two thrusts to be kept substantially constant, that is to say, the virtual load due to the hydraulic thrust is diminished automatically, in proportion to the increase of the real load. Under these conditions, the flexibility diagram of the suspension retains its traditional hyperbolic profile, but the point of operation remains in a substantially fixed position on the curve, whatever the useful load on the vehicle, which corresponds to a constant suspension flexibility.

In order that the invention may be fully understood and readily carried into effect, a preferred embodiment thereof will now be described, by way of example only, with reference to the accompanying drawing in which:

FIG. 1 is a diagrammatic view showing a suspension device embodying the invention;

FIG. 2 shows the same device during a transitional phase when the useful load on the vehicle is reduced;

FIG. 3 corresponds to an opposite transitional phase, that is, one in which the useful load on the vehicle is increased;

FIG. 4 is a diagram showing that the device according to the invention allows the points of operation to be held constant within a very limited area, which corresponds to a constant flexibility on a conventional hyperbolic curve;

FIG. 5 is a diagrammatic view of a modification of the suspension shown in FIGS. 1 and 3; and FIG. 6 is a perspective view illustrating a further possible modification.

As shown in FIGS. 1 to 4 of the accompanying drawing, a swinging suspension arm 1 carries at one of its ends a stub-axle 2 on which is mounted a vehicle wheel 3, whilst at its other end it is pivoted on a shaft 4 fixed to the body shell or chassis of the vehicle. The arm 1 acts by means of a push-rod 5 on the stem 6 of a piston 7 which is slidably disposed within a cylinder 8 mounted on the vehicle body. This cylinder opens at its upper end into a spherical reservoir 9 which is divided, medially of its depth, by a flexible membrane 10 into two chambers 11 and 13. The lower chamber 11 communicates with the cylinder 8 and with a pipe 12. The upper chamber 13 is sealed and encloses a cushion of gas, preferably compressed nitrogen.

The pipe 12 communicates with a pressure gauge comprising a cylinder 14 in which slides a piston 15. This latter is pivoted to the end of a lever 16 which swings around a fixed shaft 17. This shaft carries a linking pivot 18 which operates, by means of a push-rod 19, a slide-valve 20 working in a distributor cylinder 21. The length ratio of the arms of the lever 16 is suitably chosen in proportion to the reduction required for the relative stroke lengths of the piston 15 and the slide-valve 20.

The bottom end of the distributor cylinder 21 communicates by way of pipes 22 and 23 with a source of supply of oil under pressure. This source of supply, symbolized by an arrow P, may be any type of oil pump. The pressure of oil communicating with the distributor 21 tends to force the slide-valve 20 upwards, as shown by the arrow 24 in FIG. 2, whilst the pressure existing in the liquid compartment 11 and in the pipe 12 acts on the piston 15 to load the slide-valve 20 in the opposite direction.

The distributor cylinder 21 has a central portion, surrounding a reduced-diameter portion 25 of the slide-valve, which is in constant communication with a pipe 26. This pipe 26 can communicate with a feed pipe 27 when the slide-valve 20 is forced up in the direction of the arrow 24, under the preponderant action of the pressure within the pipe 22 (FIG. 2). Alternatively, the pipe 26 can communicate with a return pipe 28 when the downward force exerted upon the slide valve 20 by the pressure in the cylinder 14 and in the chamber 11 is greater than the upward force produced by the supply pressure of the pipe 22 so that the slide-valve 20 is forced down in the direction shown by the arrow 29 in FIG. 3.

Between these two extremes, which correspond to transitory phases of reduction and increase in the useful load of the vehicle, the slide-valve 20 occupies an intermediate position as shown in FIG. 1 when the vehicle is running with a constant load. In this case, the slide-valve blocks off both the feed pipe 27 and the reduction pipe 28, so that the pipe 26 remains isolated.

The pipe 26 opens into an annular chamber 30 which is present in the cylinder 8, below the piston 7. This chamber is closed by a cover plate 31 through which the stem 6 of the piston slideably extends in a fluid-tight manner. Conduit 26 also communicates with the lower chamber 32 of an auxiliary spherical reservoir 33 which acts as a pressure accumulator and is divided, medially of its depth, by a flexible membrane 34. An upper chamber 35 of said reservoir contains a cushion of gas. The latter is preferably nitrogen under pressure.

There is interposed in the feed pipe 23, between the pipes 12 on the one hand and 27, 22 on the other, a level-corrector 36 which may be constituted by a hydraulic valve of any known type, with a slidable rotatable valve body. A fluid-return pipe 40 is connected to the level-corrector 36 which is operated by a lever 37 linked by a pivoted stem 38 to the suspension arm 1. There is interposed in this stem 38 a telescopic hydraulic mechanism with a dashpot 39 which is designed to damp suspension oscillations of the arm whilst the vehicle is in motion in order to transmit to the lever 37 only definite variations in inclination of the arm 1, as opposed to rebound movements, for example when the vehicle is being loaded or unloaded. The level corrector 36 brings about three situations, according to the setting of the lever 37; namely:

(1) In the case of normal operation with constant load (FIG. 1), the pipes 12 and 23 have no communication, either with each other or with the return pipe 40 to which the corrector is inserted.

(2) When the vehicle is unloaded, the lever 37 is swung clockwise as shown by the arrow 41 in FIG. 2, and the pipe 12 is vented to the return pipe 40, the feed pipe 23 remaining cut off.

(3) If, on the contrary, the vehicle is being loaded (FIG. 3), the lever 37 is swung counter-clockwise, as shown by the arrow 42, and the level-corrector establishes a connection between the pipes 12 and 23, the return pipe 40 remaining cut off.

The operation of the suspension is as follows:

In the normal operating position, that is to say, when the load on the vehicle remains constant, the suspension arm 1 occupies the medial position shown in FIG. 1, as does in consequence the lever 37 of the corrector 36. Since the latter is closed, a constant volume of oil is isolated in the chamber 11, in the cylinder 14 and in the pipe 12 which connects them. This oil is at an average pressure which, acting on the piston 15, is capable of holding the slide-valve 20 in the mid-position shown in FIG. 1, so that the pipe 26 remains cut off from the feed pipe 27 and the return pipe 28. In consequence, the suspension of the vehicle is ensured by the double-acting device which comprises the piston 7, the oil chambers 11 and 32 and the gas cushions of the chambers 13 and 35.

It will be understood that the gas cushion contained in the chamber 35 maintains the oil of the chambers 30 and 32 under pressure, so that the piston 7 is subject to a hydraulic thrust upward, as shown in FIG. 1 by the arrow 44. This thrust gives rise to what may be called a virtual or hydraulic load $Ch$, which is added to the useful load $Cu$ acting on the vehicle to press down the suspension. The total load of the vehicle C is thus given by the expression $C=Cu+Ch$.

If a diagram of the kind shown in FIG. 4 is drawn, on which the ground-clearance $f$ of the body of the vehicle—that is the flexing of the suspension—is shown as a function of the total load C, it is seen that the movements of the suspension at a constant load in the case shown in FIG. 1 correspond to a very short segment $mn$ or a hyperbolic arc $ab$. The variation $\Delta C$ corresponds to the dynamic effects due to the shocks to the wheel 3 caused by the unevenness of the road when the vehicle is in motion. The presence of the dashpot 39 ensures that these repeated movements of small magnitude are not transmitted to the lever 37.

If the vehicle is unloaded (reduction in $Cu$), the suspension arm 1 tends to swing downwards relative to the vehicle body shell or chassis, i.e. in the direction shown by the arrow 43 in FIG. 2. This causes the level corrector 36 to be opened by means of the lever 37 so that the pipe 12 is put into communication with the return pipe 40 while remaining cut off from the feed pipe 23. Consequently, the oil pressure diminishes in the chamber 11 and in the cylinder 14, so that the slide-valve 20 moves upwards under the action of the oil pressure existing in the pipe 22. The pipe 26 is thus connected with the feed-pipe 27, and oil at supply pressure P communicates with the chamber 30 and at the same time acts against the gas cushion of the chamber 35. There results from this a hydraulic thrust on the piston 7, which tends to displace it upwardly whereby, as a final result, an increase is caused in the hydraulic load $Ch$. The assembly is adjusted in such a way as to maintain constant the sum $(Cu+Ch)$, that is to say, the total load C of the vehicle. The operating point of the suspension is thus brought back into the segment $mn$ shown in FIG. 4. As soon as the arm 1 has taken up its original position again, the corrector 36 is re-closed, and the situation of FIG. 1 is re-established, which preserves the initial flexibility of the suspension in spite of the reduction in the useful load.

When, on the other hand, the vehicle is appreciably loaded (increase in $Cu$; FIG. 3), the suspension arm 1 tends to pivot in the direction shown by the arrow 45, which causes the lever 37 to swing counterclockwise, i.e. in the direction of the arrow 42. The return pipe 40 is then isolated whilst communication is established directly between the pipe 12 and the pipe 23, so that additional oil is supplied to the chamber 11 and causes a rise in the pressure in the cylinder 14. Owing to the mechanical advantage of the lever 16, the slide-valve 20 is pressed downwards, as shown by the arrow 29, which puts the pipe 26 in communication with the return pipe 28. The pressure falls in the chamber 30, which reduces, or even eliminates, the hydraulic load $Ch$. In this way the total load of the vehicle C is kept constant in spite of the increase in the useful load $Cu$. Here again, the zone of operation is brought back onto the segment $mn$ shown in FIG. 4.

In effect, it will be seen that the flexibility of the suspension is held constant, since the operation of the device is centered on an imaginary point which is almost fixed on the flexibility curve.

According to FIG. 5 of the accompanying drawing, in a modification of the suspension hereinbefore described, the lever 16 is extended beyond the shaft 17 by an arm 50. At its free end, this arm 50 carries a linking pin 51 on which pivots the upper end of a tie-rod 52. A tension spring 53 of suitable characteristics attaches the pivoted tie-rod 52 to a lug 54 on the suspension arm 1.

It will be understood that when the total load carried by the arm 1 increases, which tends to make it swing counterclockwise as indicated by the arrow 45, resulting slackening of the spring 53 tends to make the lever 16 swings in clockwise direction according to arrow 56, without any delay due to the hydraulic reaction of the suspension system as is the case with the previously described suspension. The slide-valve 20 is thus subjected without delay to an impulse which tends to displace it in the direction of the arrow 29, i.e. downwardly so that the virtual load is reduced, to effect the correction required.

On the other hand, if the total load diminishes, that is if the arm 1 tends to swing in the counterclockwise direction opposite to the arrow 45, the additional pull exerted on the spring 53 instantly raises the slide-valve 20 in the direction opposite to the arrow 29, thereby carrying out the necessary correction.

According to FIG. 6 in another possible modification of the suspension described with reference to FIGS. 1 to 3, there is fixed to the lever 16 at its fulcrum 17 one end end of a torsion bar 58. This bar, which is preferably elbow-shaped, is articulated at its other end, by means of a pivot pin 60, to the top of a tie-rod 59. The tie-rod 59 is itself pivotally connected to a lug 54 on the suspension arm 1.

The operation of the suspension is similar to that which has just been described with reference to FIG. 5, that is to say, any movement of the arm in one direction or the other subjects the lever 16 to an immediate impulse which tends to displace the distributing slide-valve 20 in the direction of the required correction.

The described operation of the rapid-feedback linkages of FIGS. 5 and 6 occurs in response to relatively slow movements of the arm 1. In the case of rapid oscillations, for example while passing over an obstacle on the roadway, the flexibility of the link constituted by the spring 53 or by the torsion bar 58 allows the deformation to be absorbed without displacement of the slide-valve 20.

I claim:
1. A vehicular shock absorber comprising a support for a vehicle wheel movable relatively to the vehicle body in response to changing loads; piston means coupled with said support; cylinder means for said piston means on said vehicle body, said piston means forming with said cylinder means a first and a second compartment, said first compartment being provided with a chamber containing a gas cushion acting on one face of said piston means for resisting displacement of said piston means in response to the vehicular load; a hydraulic pressure accumulator communicating with said second compartment for exerting upon said piston means a hydraulic force supplementing the action of said vehicular load in opposing the pneumatic force of said gas cushion; and compensating means linked with said support, said cylinder means and said accumulator for additionally charging and at least partly discharging said pressure accumulator in response to reductions and increases, respectively, of said vehicular load, thereby exerting upon said piston means a substantially constant overall force opposing said pneumatic force.

2. A shock absorber as defined in claim 1 wherein said chamber is provided with a membrane, said first compartment containing a volume of liquid disposed adjacent said one face, said membrane separating said gas cushion from said volume of liquid; said compensating means including flow-control means for supplying high-pressure hydraulic fluid to said first compartment upon a reduction in the ground clearance of said vehicle body and allowing the escape of hydraulic fluid from said first compartment upon an increase in said ground clearance, a hydraulic pressure-responsive device in open communication with said first compartment, and valve means actuated by said device and communicating with said pressure accumulator for controlling the charging and discharging of said pressure accumulator.

3. A shock absorber as defined in claim 2 wherein said device comprises an auxiliary cylinder and an auxiliary piston in the latter, said valve means having a slider mechanically connected with said auxiliary piston.

4. A shock absorber as defined in claim 3 wherein the connection between said slider and said auxiliary piston comprises a lever having a fulcrum more remote from said auxiliary piston than from said slider.

5. A shock absorber as defined in claim 4 wherein said lever is provided with an extension and with a resilient linkage connecting said extension with said support.

6. A shock absorber as defined in claim 5 wherein said support is a swingable arm.

7. A shock absorber as defined in claim 6 wherein said resilient linkage includes a coil spring.

8. A shock absorber as defined in claim 6 wherein said resilient linkage includes a torsion shaft.

9. A shock absorber as defined in claim 3 wherein said valve means is provided with conduit means leading to a source of high-pressure hydraulic fluid for biasing said slider in opposition to the fluid pressure in said device as determined by the pressure in said first compartment.

10. A shock absorber as defined in claim 1 wherein said pressure accumulator comprises a fluid reservoir with an overlying second gas cushion.

References Cited
UNITED STATES PATENTS

| | | |
|---|---|---|
| 2,978,254 | 4/1961 | Bundorf. |
| 3,088,726 | 5/1963 | Dangauthier. |

FOREIGN PATENTS

| | | |
|---|---|---|
| 1,301,331 | 7/1962 | France. |

A. HARRY LEVY, Primary Examiner

U.S. Cl. X.R.

267—64